United States Patent
Byskov et al.

(10) Patent No.: US 10,330,082 B2
(45) Date of Patent: Jun. 25, 2019

(54) BLADE DEFLECTION MONITORING SYSTEM

(71) Applicant: LM WP PATENT HOLDING A/S, Kolding (DK)

(72) Inventors: Claus Byskov, Silkeborg (DK); Peter Baek, Kolding (DK); Michael Klitgaard, Odense S (DK); Casper Skovby, Roskilde (DK); Lars Fuglsang, Odense S (DK)

(73) Assignee: LM WP PATENT HOLDING A/S, Kolding (DK)

( * ) Notice: Subject to any disclaimer, the term of this patent is extended or adjusted under 35 U.S.C. 154(b) by 361 days.

(21) Appl. No.: 14/421,683

(22) PCT Filed: Aug. 14, 2013

(86) PCT No.: PCT/EP2013/067009
§ 371 (c)(1),
(2) Date: Feb. 13, 2015

(87) PCT Pub. No.: WO2014/027032
PCT Pub. Date: Feb. 20, 2014

(65) Prior Publication Data
US 2015/0240787 A1  Aug. 27, 2015

(30) Foreign Application Priority Data
Aug. 17, 2012 (EP) .................................. 12180776

(51) Int. Cl.
*F03D 7/06* (2006.01)
*G01S 13/08* (2006.01)
(Continued)

(52) U.S. Cl.
CPC ........... *F03D 7/042* (2013.01); *F03D 1/0675* (2013.01); *F03D 7/0224* (2013.01); *F03D 17/00* (2016.05);
(Continued)

(58) Field of Classification Search
CPC .. F03D 11/0091; F03D 1/0675; F03D 7/0224; F03D 7/042; F03D 17/00
See application file for complete search history.

(56) References Cited

U.S. PATENT DOCUMENTS

| | | | | |
|---|---|---|---|---|
| 4,430,044 A | * | 2/1984 | Liljegren | .................. F03D 7/06 416/119 |
| 7,209,724 B2 | * | 4/2007 | Richards | .............. H04B 1/7163 455/266 |

(Continued)

FOREIGN PATENT DOCUMENTS

| | | |
|---|---|---|
| DE | 10 2010 019 014 A1 | 11/2011 |
| EP | 2 485 011 A1 | 8/2012 |
| WO | 2009/143848 A2 | 12/2009 |

OTHER PUBLICATIONS

International Search Report dated Mar. 27, 2014 in International Application No. PCT/EP2013/067009.

*Primary Examiner* — Kayla McCaffrey
(74) *Attorney, Agent, or Firm* — Nath, Goldberg & Meyer; Jerald L. Meyer; Tanya E. Harkins (57) ABSTRACT

A system for monitoring the deflection of a wind turbine blade is described. The system comprises a wireless range-measurement system, having at least one wireless communication device located towards the root end of the blade and at least one wireless communication device located towards the tip end of the blade. The root end device is provided on a bracket projecting from the external surface of the blade, to provide a communication path between the root end and tip end devices which is less susceptible to interference from (Continued)

multipath effects, etc. There is further provided a method to derive tilt and yaw moments from measured deflections. A control method for such a system is also described, wherein the signal gain of the communication path may be varied based at least in part upon the deflection characteristics of the wind turbine blade.

27 Claims, 5 Drawing Sheets (51) Int. Cl.
  *G01S 11/02* (2010.01)
  *F03D 7/04* (2006.01)
  *F03D 1/06* (2006.01)
  *F03D 7/02* (2006.01)
  *F03D 17/00* (2016.01)
(52) U.S. Cl.
  CPC ..... *F05B 2270/17* (2013.01); *F05B 2270/331* (2013.01); *F05B 2270/821* (2013.01); *Y02E 10/721* (2013.01); *Y10T 29/49002* (2015.01)

(56) References Cited

U.S. PATENT DOCUMENTS

| | | | |
|---|---|---|---|
| 7,883,316 | B2 | 2/2011 | Kildegaard |
| 8,570,207 | B1* | 10/2013 | Dawood ................. G01S 7/282 342/179 |
| 9,128,184 | B1* | 9/2015 | Bachmann ............ F03D 7/0268 |
| 2007/0297892 | A1 | 12/2007 | Kildegaard |
| 2010/0021298 | A1* | 1/2010 | Sandvad ................. F03D 7/047 416/1 |
| 2011/0150647 | A1* | 6/2011 | Gierlich ................. F03D 17/00 416/1 |
| 2011/0285129 | A1 | 11/2011 | Li et al. |
| 2012/0035865 | A1* | 2/2012 | Fujioka ................... F03D 17/00 702/42 |
| 2012/0200444 | A1* | 8/2012 | Andersen ............... G01B 15/06 342/6 |

* cited by examiner

BLADE DEFLECTION MONITORING SYSTEM

This is a National Phase Application filed under 35 U.S.C. 371 as a national stage of PCT/EP2013/067009, filed Aug. 14, 2013, an application claiming the benefit of European Application No. 12180776.2, filed Aug. 17, 2012, the content of which is hereby incorporated by reference in its entirety.

FIELD OF THE INVENTION

The present invention relates to a system and method for the monitoring of deflection of a wind turbine blade.

BACKGROUND OF THE INVENTION

Modern wind turbine designs seek to incorporate various blade monitoring systems, in order to provide for reliable and controlled operation of the wind turbine. Such monitoring systems can include blade deflection monitoring systems, which are used to provide an indication of wind turbine blade deflection or flexing during turbine operation. This information can be used to monitor for the possibility of a future tower strike by the wind turbine blades, and to perform appropriate controller actions, e.g. blade pitching or turbine braking to avoid such a predicted tower strike.

An example of such a deflection monitoring system is provided in U.S. Pat. No. 7,883,316, which describes a deflection monitoring system utilizing a wireless communication network, operable to detect the position of various points along the length of the blade, and to determine blade bending from this information.

However, it has been found that such wireless monitoring systems are vulnerable to various operational factors which act to reduce the effectiveness of the monitoring system, e.g. interference from reflection or multipath effects, signal attenuation caused by passing through layers of different materials, etc. Traditionally, such monitoring systems are mounted internally of the wind turbine blade structure, and are accordingly susceptible to considerable interference due to signal reflection from the internal blade laminates and blade spars.

It is an object of the invention to provide an improved blade deflection monitoring system which is less susceptible to the above-described factors.

SUMMARY OF THE INVENTION

Accordingly, there is provided a wind turbine blade comprising an airfoil profile body having a pressure side and a suction side, and a leading edge and a trailing edge with a chord length extending therebetween, the blade having a tip end and a root end, the wind turbine blade further comprising:

at least one tip communication device located towards said tip end, at least one root communication device located towards said root end, said at least one root communication device in wireless communication with said at least one tip communication device via a wireless communication path, to monitor the distance between said at least one tip communication device and said at least one root communication device to determine a movement of said at least one tip communication device relative to said at least one root communication device indicative of a blade deflection, wherein said at least one root communication device is provided on at least one bracket projecting from an external surface of said wind turbine blade at said root end, wherein said root communication device is spaced from the external surface of said blade to minimize path loss in the communication path between said at least one tip communication device and said at least one root communication device.

Through monitoring for changes in the distance between communications devices provided towards the root and tip ends of the blade, it is relatively easy to determine the deflection of the wind turbine blade. This information can then be used to provide for improved wind turbine control, e.g. in the event that a blade deflection may lead to a tower strike, emergency pitching of the wind turbine blade may be carried out.

By positioning the root communication device on the exterior of the blade, and furthermore by spacing the communication path away from the blade surface, the communication path between the two communication devices is less affected by path loss due to reflection, multipath, signal attenuation and/or signal absorption. This results in improved signal quality for the communication link between the devices, and accordingly provides for an improved blade deflection detection system. Furthermore, the positioning of the root and tip devices on the blade itself ensures that the communication path between the devices is maintained, regardless of blade pitch or rotation, or turbine yaw movements. By providing the devices in the same pitching co-ordinate system, this allows for a considerable simplification of the calculations required for system operation, when compared with alternative systems having a first device mounted to a blade and a second device mounted to a rotor hub or to a turbine nacelle.

Preferably, said at least one bracket projects from the external surface of said wind turbine blade, said at least one root communication device located at a distal end of said at least one bracket, the wind turbine blade having a characteristic maximum deflection shape for the wind turbine blade, wherein the length by which said at least one bracket projects from the external surface of the wind turbine blade is selected based on said characteristic maximum deflection shape, such that the path loss of the communication path between said at least one tip communication device and said at least one root communication device is below a predetermined acceptable path loss level.

As any wind turbine blade will have a maximum deflection level that the blade is certified for, this can be seen as a worst-case deflection scenario. Accordingly, by spacing the root communication device at a certain distance from the surface of the blade, an acceptable signal communication level can be ensured for all predicted deflection levels of the blade.

Additionally or alternatively, said at least one bracket projects from the external surface of said wind turbine blade, said at least one root communication device located at a distal end of said at least one bracket, wherein said at least one tip communication device is provided on the external surface of the wind turbine blade, the wind turbine blade having a range of certified deflection shapes, wherein the length by which said at least one bracket projects from the external surface of the wind turbine blade is selected such that a line-of-sight communication path is maintained between said at least one tip communication device and said at least one root communication device for said range of certified deflection shapes of said blade.

By providing the root communication device on a relatively long bracket, a line-of-sight connection between the tip and root devices can be maintained for all predicted deflection shapes of the wind turbine blade, resulting in an excellent signal quality for the communication path between the devices.

It will be understood however that the tip communication device may be provided internally of the blade body, e.g. on an internal blade beam, web, or spar.

Alternatively, said tip communication device may be provided externally of the blade body. For example, the tip communication device may be mounted to an external surface of the blade, or located within a groove, channel or aperture defined on the external surface of the blade, such that at least a portion of said tip communication device is exposed to the exterior of the blade. By locating the tip communication device exterior of the blade body, the quality of the signal strength between the communication devices is preserved and the waveform has reduced distortion, as the signal does not have to pass through the wall of the blade body between the devices. For an externally-mounted tip device, preferably the device is shaped to reduce acoustic noise, and/or the blade further comprises noise-reduction features, to lessen the effect of any operational noise produced by the externally-mounted device.

Preferably, the system is configured such that the communication signal propagates along either the leading or trailing edge of the blade, and flapwise bending of blade results in maximum change in signal propagation time.

Preferably, said at least one root communication device is located towards the leading edge or trailing edge of said wind turbine blade. Preferably, said at least one tip communication device is located towards the leading edge or trailing edge of said wind turbine blade. In one aspect on the invention, said at least one root communication device and said at least one tip communication device are located towards the same side of said wind turbine blade.

By locating the communication devices at or near the blade leading or trailing edges, this provides for improved signal quality of the communication path between the root and tip devices. Firstly, due to the relatively high curvature of the external surface of the blade at the leading and trailing edges, any signal reflections from this curved surface will be scattered over a relatively wide area, compared to similar reflections from a relatively planar surface. As a result, any reflection interference to the communication path between the devices will be reduced. Secondly, due to the relatively small edgewise deflection of wind turbine blade when compared to flapwise blade deflection, the bracket height can be kept relatively small to maintain a line-of-sight connection between the devices, or at least a communication path having low path loss.

Additionally, as the thickness of the blade laminate at the blade leading or trailing edge is relatively thin when compared with the thickness at other sections of the blade, e.g. where the laminate is thicker for structural reasons, if the communication path between the root and tip devices must pass through a portion of the blade body, the signal quality of the communication path is less affected by having to pass through a relatively thin laminate section.

It will be understood that the devices may be provided at the blade leading or trailing edges, or adjacent the leading or trailing edge.

Preferably, the wind turbine blade comprises a first root communication device provided on a first bracket and a second root communication device provided on a second bracket, the first and second root communication devices provided towards the leading or trailing edge wherein said first root communication device is located on the pressure side of said leading or trailing edge and said second root communication device is located on the suction side of said leading or trailing edge.

By placing the root devices on either side of the leading or trailing edge, the root devices can be provided at definable positions which allow for trilateration and/or triangulation distance or location measurements.

Preferably, the wind turbine blade comprises a first tip communication device located at a first position along the length of the wind turbine blade towards the tip end of the blade and a second tip communication device located at a second position along the length of the wind turbine blade towards the tip end of the blade, wherein said first position is spaced from said second position, said second position located between said first position and said tip end.

Spacing the two tip devices along the length of the blade allows for blade deflection to be calculated for two distinct points along the length of the blade. Accordingly, a more accurate estimation of blade deflection can be provided, and the system additionally allows for measurement of blade moments and the monitoring of blade mode shapes. This can result in accurate control of blade mode excitation, through appropriate control of blade active devices, actuators, etc.

Preferably, said at least one root communication device is operable to determine the location of said at least one tip communication device using trilateration. Additionally or alternatively, said at least one root communication device is operable to determine the location of said at least one tip communication device using triangulation.

Preferably, said at least one tip communication device and said at least one root communication device are ultra-wideband (UWB) location tracking and/or communication devices, and wherein said communication path is a UWB signal communication path.

UWB communication allows for a range or distance measurement to be performed between a transmitter and a receiver device, in a low-power application, minimizing the effects of outside interference.

It will be understood that said at least one tip communication device and/or said at least one root communication device is selected from one of the following: a receiver, a transmitter, a receiver-transmitter circuit, or a transceiver. It will further be understood that the at least one tip communication device may comprise an antenna provided towards said tip end, the antenna coupled to a receiver, transmitter, receiver-transmitter circuit, or transceiver device provided at a separate location, e.g. towards the blade root end.

Such a setup will allow for the relatively complex electronics of the receiver, transmitter, receiver-transmitter, or transceiver circuit to be positioned at a relatively easily serviceable location, e.g. a blade root end. An antenna may be provided at a location adjacent the tip end, and coupled to the electronics via a signal cable or other suitable connection. Such a cable may be provided coupled to internal blade components, e.g. an internal lightning down conductor cable.

Preferably, the wind turbine blade comprises at least one processor component communicatively coupled to at least one of said communication devices, wherein said at least one processor component is arranged in a controller housing located at or adjacent the root end of the wind turbine blade, wherein said at least one processor component is selected from at least one of the following: a receiver, a transmitter, a receiver-transmitter circuit, a transceiver, a controller.

In this embodiment, the relatively sensitive active electronics used to transmit, receive, and/or at least partially process the wireless communication signals can be housed in a secure environment, which may be sealed to prevent ingress of moisture, and/or electrically shielded to prevent external electromagnetic interference and/or lightning strikes from affecting the contained components. For example, said housing may be coupled to a lightning protection system of a wind turbine, to provide a path to ground for any lightning strikes on the housing. Such a controller housing can accordingly be located in a relatively easily serviceable location, to allow for service and/or repair of components when needed, e.g. at the root end of a blade, or in a wind turbine hub or nacelle.

Preferably, the wind turbine blade comprises at least one blade module coupled to said at least one tip communication device, wherein said at least one tip communication device and said at least one root communication device are operable to transmit data to or from said at least one blade module using said communication path between said at least one tip communication device and said at least one root communication device.

In this case, the communication path between the root and tip devices can perform the dual purpose of providing a range or distance measurement, i.e. for determining blade deflection, as well as for the transmission of data between the root and tip ends of the blade. It will be understood that the distance calculation signal transmitted via the communication path may be modulated with said data.

It will be understood that said at least one blade module may comprise a blade sensor device, e.g. an accelerometer, a strain sensor, a vibration sensor, etc., wherein said tip communication device is operable to transmit sensor data from said blade sensor device to a controller via said at least one root communication device.

Additionally or alternatively, said at least one blade module may comprise a blade active lift device, e.g. a flap, a piezoelectric surface module, a spoiler, a tab, a fluid injection device, etc., wherein said root communication device is operable to transmit a control signal to said blade active lift device via said at least one tip communication device.

In one embodiment, the wind turbine blade comprises at least one accelerometer coupled with said at least one tip communication device, said at least one accelerometer operable to correct sensor drift.

Additionally or alternatively, the wind turbine blade further comprises a controller, said controller operable to control a signal transmitted along said communication path between said at least one tip communication device and said at least one tip communication device,
    wherein said controller is further operable to adjust the signal gain of said signal based on at least one of the following: a measured blade deflection level, a predicted blade deflection level, a signal strength level of a signal received via said communication path.

Such an adaptive control of the communications link between the root and tip devices provides for improved system operation, and reduced operational power requirements due to optimized signal levels.

The controller may act to reduce signal gain when the deflection level of the blade is known to provide reduced interference to the communication path, e.g. when the blade allows a clear line-or-sight path between the root and tip devices. In addition, as the deflection characteristics of the blade are known, it is possible to determine the effect that a particular blade deflection may have on signal quality in the communication path. Accordingly, the controller can act to adjust signal gain based on the interference and/or absorption characteristics of the deflected blade.

As blade deflection can be monitored over time, it may be possible to predict the likely future deflection of the blade. Accordingly, the controller may act to adjust signal gain based on this predicted deflection, to ensure sufficient signal quality for future time periods.

Finally, the controller may act to boost or reduce the signal gain based on the current signal conditions along the communication path, providing for improved performance.

Preferably, the wind turbine blade further comprises radio-wave absorbing material provided on at least a section of the wind turbine blade components.

Radio-wave absorbing material or radar-absorbent material acts to absorb radio waves, thereby reducing the effect of multipath and signal reflections on the communication path between the root and tip devices.

Additionally or alternatively, the surface of at least a section of the wind turbine blade components may be surface treated to improve system performance, e.g. a portion of the surface may be roughened through a grinding or abrasive process, such that any signal reflections from such a surface are reflected or scattered across a random distribution of directions.

Preferably, the radio-wave absorbing material is provided on that sections of the wind turbine blade located adjacent to or on the communication path between said at least one tip communication device and said at least one tip communication device.

The absorbing material can be provided at the locations providing the most benefit for the reduction of signal interference to the communication path, e.g. along a portion of the blade leading edge, along a section of the internal blade webs, etc.

Additionally, there is provided a wind turbine having at least one wind turbine blade as described above.

Preferably, the wind turbine comprises a pitch control system operable to adjust the pitch of at least one wind turbine blade of said wind turbine, wherein the input to said pitch control system is at least partially based on the determined movement of said at least one tip communication device relative to said at least one root communication device indicative of a blade deflection.

It will be understood that the wind turbine may be provided with a supplementary safety system, which is operable to ensure turbine safety, and prevent tower strikes, etc., in the event of failure of the blade deflection measurement system.

There is further provided a blade deflection monitoring system for installation on a wind turbine blade, the wind turbine blade comprising an airfoil profile body having a pressure side and a suction side, and a leading edge and a trailing edge with a chord length extending there between, the blade having a tip end and a root end, the monitoring system comprising:
    at least one tip communication device for installation towards the tip end of a wind turbine blade,
    at least one root communication device for installation towards the root end of a wind turbine blade, and
    a controller to operate said communication devices in wireless communication to monitor the distance between said at least one tip communication device and said at least one root communication device when installed on a wind turbine blade to determine a movement of said at least one tip communication device relative to said at least one root communication device indicative of a blade deflection, wherein said at least one root communication device is arranged to be located spaced from an external surface of the wind turbine blade at said root end.

Preferably, the monitoring system comprises at least one bracket for mounting on an external surface of a wind turbine blade at the root end of the wind turbine blade, wherein said at least one root communication device is arranged on a distal end of said at least one bracket.

There is further provided a method of monitoring the deflection of a wind turbine blade, the wind turbine blade having a pressure side and a suction side, and a leading edge and a trailing edge with a chord length extending therebetween, the blade having a tip end and a root end, the method comprising the steps of:

providing at least one tip communication device located towards the tip end of a wind turbine blade, providing at least one root communication device located towards the root end of said wind turbine blade, said at least one root communication device in wireless communication with said at least one tip communication device via a wireless communication path, transmitting a signal between said at least one tip communication device and said at least one root communication device along said wireless communication path, calculating a distance measurement between said at least one tip communication device and said at least one root communication device based on said signal, and determining a current blade deflection value based on said distance measurement, wherein the method further comprises the step of adjusting a signal gain level of said signal based on at least one of the following: the current blade deflection value, a predicted blade deflection value based at least in part upon said current blade deflection value, or a signal strength level of a signal received via said communication path.

The use of such a control method can provide improved performance over existing systems, as the power consumption of the wireless communication system can be optimised for most efficient operation, and which may be based on the prior knowledge of the structural characteristics of the wind turbine blade in question.

There is further provided a method of controlling a wind turbine having at least one wind turbine blade, the method comprising the steps of:

monitoring the deflection of at least one wind turbine blade as described above; and controlling the operation of the wind turbine blade based at least in part on the monitored deflection of the at least one wind turbine blade, preferably by pitching at least one wind turbine blade to control the deflection of said at least one wind turbine blade.

There is further provided a method of designing a blade monitoring system as described above for use on a wind turbine blade, the method comprising the steps of:

providing a wind turbine blade comprising an airfoil profile body having a pressure side and a suction side, and a leading edge and a trailing edge with a chord length extending therebetween, the blade having a tip end and a root end and a defined characteristic deflection profile, providing at least one tip communication device located towards said tip end, providing at least one root communication device located towards said root end, said at least one root communication device in wireless communication with said at least one tip communication device via a wireless communication path, to monitor the distance between said at least one tip communication device and said at least one root communication device to determine a movement of said at least one tip communication device relative to said at least one root communication device indicative of a blade deflection, providing at least one bracket projecting from an external surface of said wind turbine blade at said root end, wherein said at least one root communication device is provided on said at least one bracket, and calculating a predicted signal quality level for the wireless communication path between said at least one tip communication device and said at least one root communication device for a series of blade deflection shapes of said defined characteristic deflection profile, wherein the method further comprises the step of:

selecting the height of said at least one bracket such that said at least one root communication device is spaced from the external surface of said blade, such that the predicted signal quality level for the wireless communication path is above an acceptable quality limit for a defined range of blade deflection shapes of said defined characteristic deflection profile.

By utilising the known deflection profile of the blade, it is possible to provide a simple and efficient method for deriving the best location of the root device, such that signal quality is maintained at an acceptable level for a range of estimated deflection shapes. This ensures effective operation of the deflection monitoring system.

Preferably, said defined range of blade deflection shapes comprises the certified deflection range of said wind turbine blade.

As each wind turbine blade will have a certified maximum deflection level, an operational deflection range of the blade can be seen as the range of deflection shapes between the normal at-rest shape of the blade and the certified maximum deflection shape of the blade. Selecting the bracket height based on this operational range of shapes ensures that the operation of the deflection monitoring system will not be seriously affected by any of the predicted deflection shapes of the blade.

Preferably, the height of said bracket is selected such that a direct line between said at least one tip communication device and said at least one root communication device passes through less than a predefined blade laminate thickness for said defined range of blade deflection shapes.

A direct line can be understood as an RF Line of Sight (RF LOS), which is a direct line between a transmitter and a receiver, passing through whichever obstacles may be located in the way. As the thickness of the laminate that the signal passes through can determine the effects of multipath and signal attenuation on the received signal, by selecting the height of the bracket to ensure that the transmitted signal will pass through a predefined acceptable laminate thickness level ensures that the signal quality of the deflection system can be guaranteed to acceptable levels for the range of predicted deflection shapes. It will be understood that the signal will most likely propagate at a relatively low angle through the laminate, and that the predefined laminate thickness level is understood to refer to the thickness of the laminate in the appropriate angled direction.

Preferably, said direct line passes through less than two layers of laminate of the wind turbine blade for said defined range of blade deflection shapes.

In the event that deflection of the blade will result in the signal path between the root and tip devices having to pass through at least a portion of the body of the wind turbine blade, preferably the signal path between devices will only pass through a single blade laminate layer at most. This may occur when the tip device is provided internally of the wind turbine blade, and/or wherein deflection of the blade results in a portion of the blade laminate being positioned in the RF Line-of-Sight between the root and tip devices.

In one aspect, the height of said bracket is selected such that a clear line of sight is maintained between said at least one tip communication device and said at least one root communication device for said defined range of blade deflection shapes.

A clear line of sight will be understood as meaning no obstructions between a transmitter and receiver, also known as a visible or optical line of sight. Such a configuration may require the use of a relatively long bracket, as well as an externally-mounted tip communication device.

DESCRIPTION OF THE INVENTION

Embodiments of the invention will now be described, by way of example only, with reference to the accompanying drawings, in which:

FIG. 7 is a pair of illustrative sketches of the communication paths of the blade deflection monitoring system of the invention when the blade is (a) unbent and (b) subject to bending.

It will be understood that the attached drawings are illustrative only, and are not provided to scale.

Figure 1:
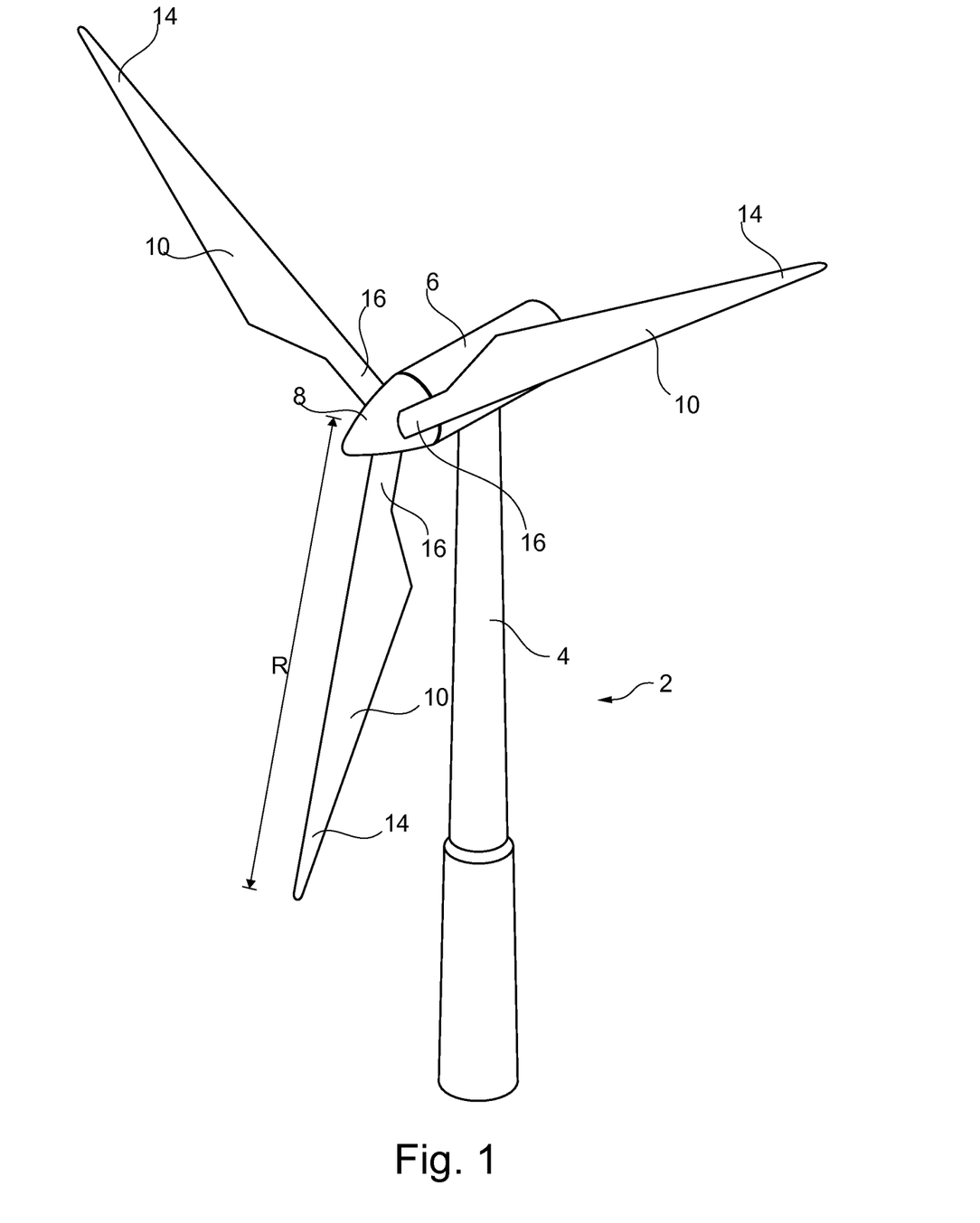
FIG. 1 shows a wind turbine.

FIG. 1 illustrates a convention modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 further from the hub 8. The rotor has a radius denoted R.

Figure 2:
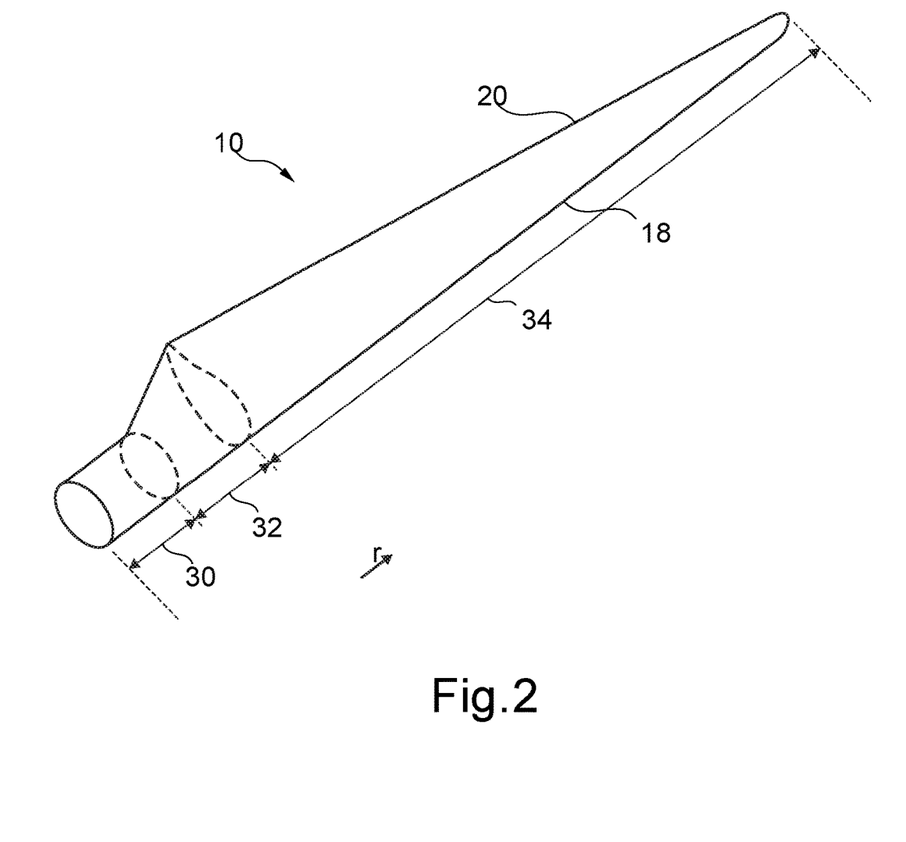
FIG. 2 shows a schematic view of a wind turbine blade.

FIG. 2 shows a schematic view of a first embodiment of a wind turbine blade 10 which may be used according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
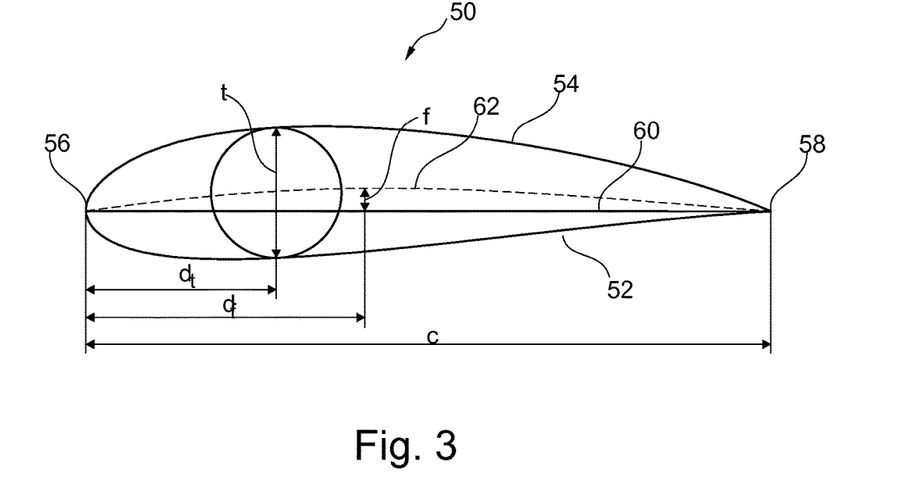
FIG. 3 shows a schematic view of an airfoil profile of the blade of FIG. 2.

FIG. 3 shows a schematic view of an airfoil profile 50 of a typical blade of a wind turbine depicted with the various parameters which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Wind turbine blades are generally formed from fibre-reinforced plastics material, i.e. glass fibres and/or carbon fibres which are arranged in a mould and cured with a resin to form a solid structure. Modern wind turbine blades can often be in excess of 30-40 meters in length, having blade root diameters of several meters.

Figure 4:
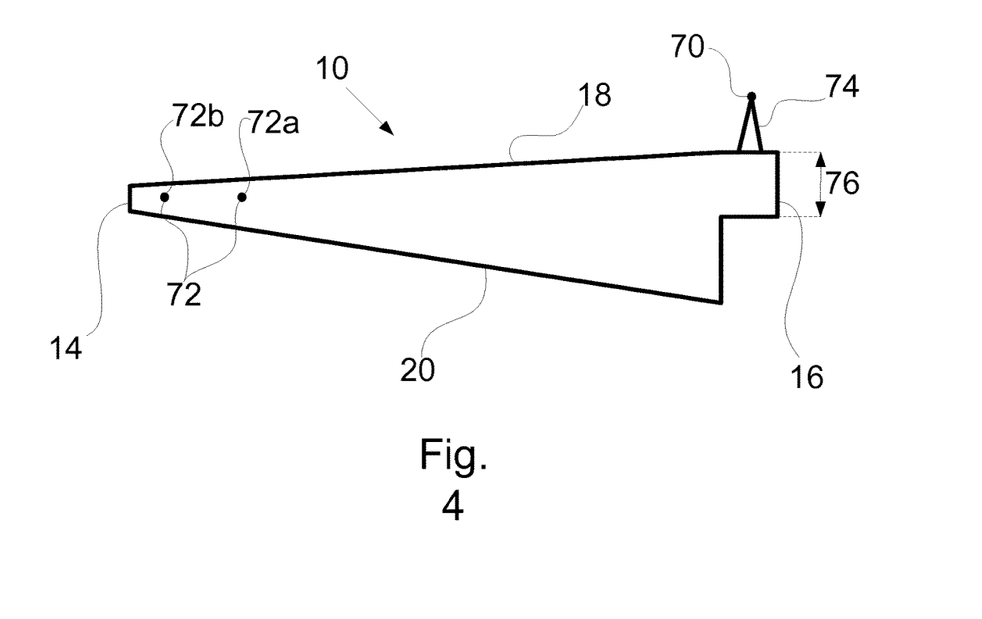
FIG. 4 illustrates a wind turbine blade having a blade deflection monitoring system according to an embodiment of the invention.

With reference to FIG. 4, a wind turbine blade 10 is shown having a blade deflection monitoring system according to the invention. The deflection monitoring system comprises at least one root end wireless communication device 70 and at least one tip end wireless communication device 72. The respective wireless devices 70,72 are operable to establish a communication link, and perform a range measurement between the different devices 70,72. The blade 10 may further comprise a controller (not shown) which is operable to receive the range measurement details from the communication devices in order to determine the measured blade deflection.

In order to minimise the effects of multipath and/or signal absorption, the root end communication device 70 is provided on a bracket 74 formed by a tripod or arm projecting from the external surface of the wind turbine 10. The root end communication device 70 is provided at a distal end of the bracket 74, such that the root end communication device 70 is spaced from the external surface of the blade 10. Accordingly, the effect of reflections from the surface of the blade 10 on the communications link between the root and tip devices 70,72 is reduced, resulting in an improved signal quality between the root and tip communication devices 70,72.

Preferably, the height of the bracket 74 above the blade surface is selected such that the signal quality of the communications link, e.g. the Signal-to-Noise ratio, is preserved above a pre-defined quality level during blade operation. In such a configuration, the path loss of the communications link between devices is maintained at acceptable levels for efficient and effective operation of the blade deflection monitoring system.

In one aspect, the bracket 74 has a height of approximately 1 meter above the surface of the wind turbine blade.

In one aspect, the height by which the bracket 74 projects above the external surface of the wind turbine blade is between approximately 10%-50% of the diameter of the wind turbine blade root end 16, preferably approximately 20% of the root end diameter 76. Such a bracket height will ensure that any negative effects on the communication link between the root and tip devices 70,72 will be minimised while not imposing significant structural requirements for the bracket height and possible structural loads associated therewith.

In one aspect, the root and tip devices 70,72 are located at the leading edge 18 of the wind turbine blade 10. As a communication device mounted on the leading or trailing edge 18,20 is less susceptible to flapwise bending than a sensor mounted on the pressure or suction sides of the blade 10, and as the magnitude of the edgewise bending of the blade 10 is understood to be significantly less than that of flapwise bending, this provides for improved reliability of the communications link between the root and tip devices 70,72, as the communications path between devices is less likely to be disturbed by bending of the blade 10. Furthermore, as the leading edge 18 of a blade 10 is generally a substantially even surface extending in a longitudinal direction from the root end 16 to the tip end 14 of the blade 10, a line of sight is more easily maintained between the root and tip devices 70,72 for such an arrangement.

Additionally or alternatively, the root and tip devices 70,72 may be mounted at the blade trailing edge 20.

Locating the root and tip devices 70,72 at the relatively curved blade leading or trailing edges 18,20 ensures that the path loss due to reflection will be minimised for the signal path between the devices, compared to providing the devices at the pressure or suction side surfaces such that the signal path is arranged over such relatively flat surfaces, leading to relatively high levels of signal reflection and associated path loss.

It will be understood that the positioning of the root and tip devices 70,72 may be selected based at least in part upon the wavelength of the signals used in the wireless communications link between the devices, in particular the curvature of the blade relative to the wavelength of the pulse signal. Preferably, the communication signal path is arranged along or adjacent portions of the wind turbine blade having a curvature less than the wavelength, to reduce reflection interference in the signal path.

In one embodiment of a wireless communication link, the wireless communication signals have a frequency of the order of 4.2 GHz, which results in a wavelength of approximately 7 centimeters. In such a case, the leading edge of the blade will have a relatively larger curvature, when compared with the signal wavelength, with the result that the leading edge, while curved, will act as a flat surface for the wireless signals. The flat surface will then lead to a greater reflection effect on the signal path, and increased signal interference.

By comparison, the trailing edge of a blade will have a curvature closer to that of the signal wavelength, with the result that the curved surface will produce a diffraction of the signal from the surface. Such a diffraction effect will be spread over a relatively wide area, and accordingly will have minimal effect on the signal strength of the communication signal path between the devices.

It will be understood that the devices may be positioned on a wind turbine blade such that the signal quality of the communications link between devices increases as the wind turbine blade is deflected towards a wind turbine tower. For example, the devices may be positioned such that deflection of the blade towards a tower results in less path loss between the devices, e.g. due to less reflective surfaces located along the RF Line-of-Sight between devices. In this configuration, the signal between devices becomes clearer and more accurate as the blade is deflected, such that the deflection monitoring system becomes more accurate for periods where the importance of deflection monitoring increases.

Figure 5:
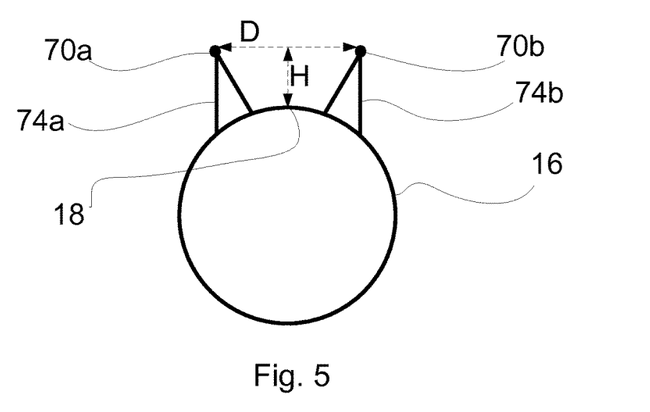
FIG. 5 is a cross-sectional view of an embodiment of the blade of FIG. 4 taken at the root end of the blade.

In a preferred embodiment of the invention, preferably first and second root end communication devices are provided 70a,70b. FIG. 5 illustrates a cross-sectional view of the first and second root end communication devices 70a, 70b located at the substantially circular root end 16 of the blade 10. The root devices 70a,70b are provided on the distal ends of respective first and second brackets 74a,74b.

Figure 6:
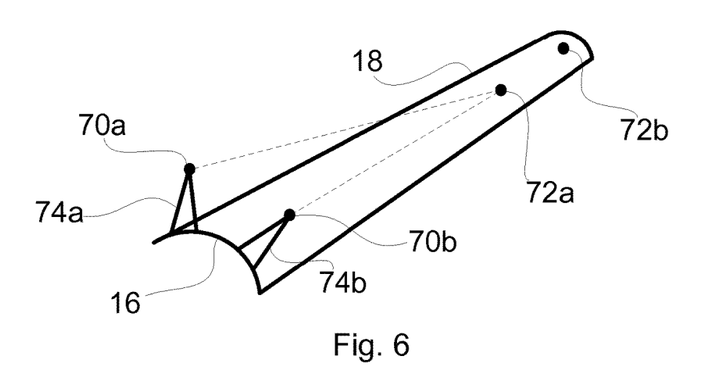
FIG. 6 is an isometric perspective view of a portion of the leading edge of an embodiment of the blade of FIG. 4.

The brackets 74a,74b project from the external surface of the wind turbine blade 10, the first and second brackets 74a,74b provided at opposite sides of the leading edge 18 of the wind turbine blade 10. FIG. 6 illustrates the root and tip end devices as arranged along a view of the leading edge 18 of the wind turbine blade 10.

Preferably, at least two tip end devices 72a,72b are provided on the wind turbine blade 10, spaced along the longitudinal direction of the blade 10 towards the blade tip end 14. As indicated in FIG. 6, by performing a range measurement between (a) the first root device 70a and the first tip device 72a, and (b) the second root device 70b and the first tip device 72a, a controller is operable to determine the position of the first tip device 72a using trilateration and/or triangulation techniques. Accordingly, the movement of the first tip device 72a may be monitored to determine deflection of the wind turbine blade 10.

Similarly, a range measurement is performed between (a) the first root device 70a and the second tip device 72b, and (b) the second root device 70b and the second tip device 72b, to determine the position of the second tip device 72b using trilateration and/or triangulation techniques. This allows for the movement of the second tip device 72b to be further monitored, to determine blade deflection at a second point along the length of the wind turbine blade 10.

The provision of two separate measurement points on the wind turbine blade 10 indicated by the location of the first and second tip devices 72a,72b allows for the measurements of blade moments during blade operation to be additionally monitored by the controller.

With reference to FIG. 5, the height of the brackets 74a,74b is selected such that the root devices 70a,70b provided on the distal ends of the respective brackets 74a,74b are located at a height H above the external surface of the wind turbine blade. Furthermore, the brackets 74a,74b are positioned such that the respective root devices 70a,70b are separated by a distance D, preferably above the leading edge 18 of the blade 10.

As the deflection characteristics of the wind turbine blade 10 may be determined from the details of the blade construction, and additionally as each wind turbine blade 10 has a maximum certified deflection level defining an allowable range of blade deflection shapes, it is possible to configure the arrangement of the blade deflection monitoring system of the invention based on the wind turbine blade in question.

In one aspect, the respective tip devices 72a,72b are provided on the exterior of the wind turbine blade 10, wherein a clear line of sight exists between the root devices 70a,70b and the tip devices 72a,72b. Preferably, the height H of the brackets 74a,74b is selected such that a clear line of sight exists between the root devices 70a,70b and the tip devices 72a,72b, with no obstructions, for all of the deflection shapes of the certified deflection for the wind turbine blade 10.

Figures 7A, 7B:
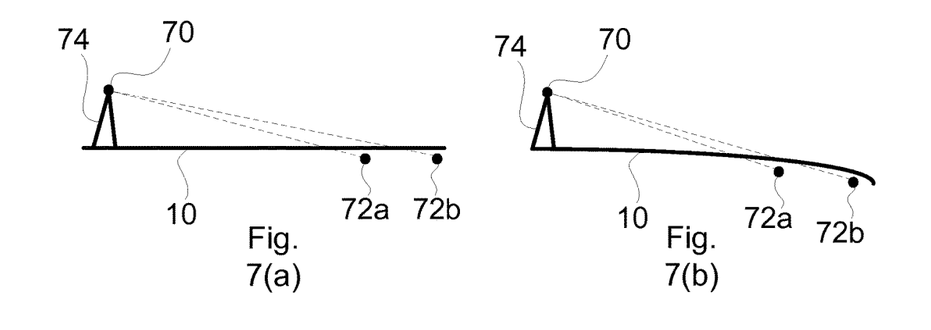

In an alternative aspect, the respective tip devices 72a,72b are provided on the interior of the wind turbine blade 10, wherein the communication link between the root devices 70a,70b and the tip devices 72a,72b passes through a portion of the structural laminate of the wind turbine blade 10, as can be seen in FIG. 7.

Preferably, the height H of the brackets 74a,74b is selected such that an RF Line-of-Sight can be maintained between the respective root and tip devices 70a,70b,72a,72b, such that the communication link is maintained between the root and tip devices 70a,70b,72a,72b for all of the deflection shapes of the certified deflection for the wind turbine blade 10, without falling below acceptable signal quality levels. Preferably, the height of the bracket 74a,74b is selected such that, for all of the certified deflection shapes, a direct RF Line-of-Sight between the root devices 70a,70b and the tip devices 72a,72b will only pass through a single layer of the structural laminate of the blade 10.

As the signal will only pass through a single laminate layer between devices, the received signal is accordingly less affected by reflections from additional surfaces between the tip and root devices.

Additionally or alternatively, the height H of the brackets 74a,74b is selected such that, for all of the certified deflection shapes, a direct RF Line-of-Sight between the root devices 70a,70b and the tip devices 72a,72b will pass through at most a maximum blade laminate thickness of approximately 20 centimeters.

Additionally or alternatively, in FIG. 7(b) the height H of the brackets 74a,74b is selected such that, for all of the certified deflection shapes, the communications path between the root devices 70a,70b and the first tip device 72a will not overlap with the communications path between the root devices 70a,70b and the second tip device 72b, thereby reducing the effect of any interference between the communications links between devices.

In one aspect, the bracket height H is between 10%-50% of the diameter of the root end of the wind turbine blade, preferably approximately 25-30%.

In one embodiment, the bracket height H is between approximately 0.5-3 meters, preferably approximately 1-2 meters.

In one aspect, the distance between root devices D is between 75-200% of the diameter of the root end of the wind turbine blade, preferably between approximately 100-150%.

By spacing the root devices relatively far away from each other, the accuracy of the trilateration and/or triangulation measurement is improved.

In one embodiment, the distance D is between approximately 0.5-5 meters, preferably between approximately 1-3 meters, further preferably approximately 2 meters.

In a further aspect, preferably the root devices are located within 0-25% of the length of the blade from the root end of the blade. Preferably, the root devices are located within 10 meters along the longitudinal direction of the blade from the root end of the blade.

It will be understood that said at least one tip communication device and/or said at least one root communication device is selected from one of the following: a receiver, a transmitter, a receiver-transmitter circuit, or a transceiver. It will further be understood that the at least one tip communication device may comprise an antenna provided towards said tip end, the antenna coupled to a receiver, transmitter, receiver-transmitter circuit, or transceiver device provided at a separate location, e.g. towards the blade root end.

Preferably, the tip devices 72a,72b are located towards the tip end 14 of the wind turbine blade 10. Preferably, the second tip device 72b is located proximate the tip end 14, and the first tip device 72a is located between the second tip device 72b and the root end 16 of the blade 10.

In one aspect, the second tip device 72b is located on the blade between 95-100% of the length of the blade from the root end 16, and the first tip device 72a is located between 90-95% of the length of the blade from the root end 16.

In one embodiment, the second tip device 72b is located within 2 meters of the tip end 14 of the blade 10, preferably approximately 1 meter, and the first tip device 72a is located within 5 meters of the tip end 14 of the blade 10, preferably approximately 2.5 meters.

The wind blade comprises mode shapes in which it vibrates, or deforms. Modal analysis can be performed on wind turbine blades, to determine the blade eigenfrequencies and mode shapes. In one aspect, the tip devices are positioned based on the known mode shapes of the wind turbine blade, in particular the first and second order shapes of the blade, the mode 1 and mode 2 shapes of the blade. In such known mode shapes, a node is a point on the structure which does not oscillate for a particular mode shape.

Any measured deflection at a point on the blade will be a superposition of all the exited modes. The large majority of such deflection will be from the first and second mode shapes, as they hold the most energy. Accordingly, it is advantageous to focus on the first two mode shapes which are exited on the blade, as the third and above hold very little energy.

By measuring two positions on the blade, it is possible to have two equations with two unknowns (the mode 1 and mode 2 coordinates), and thereby determine the amount of mode 1 and mode 2 excitation in the current blade deflection. Having the first two mode shape coordinates, and knowing the stiffness of the blade, it is possible to calculate the deflection, and bending moment at any location of the blade from the tip to the root.

It will be understood that any two measurement locations may be selected along the length of the blade to determine the mode 1 and mode 2 shapes.

Preferably, the second tip device 72b is provided at a location between the node of the mode 2 shape and the tip end of the blade, and the first tip device 72a is provided at the location of the node of said mode 2 shape. Even with a small uncertainty in the placement of this the first tip device 72a, it will not sense the mode shape 2 deformation. Accordingly, a measurement of mode shape 1 is performed without the influence of mode shape 2.

The second tip device 72b is preferably placed close to the tip in order to get a good measurement of the tip position. This measurement position will be a superposition of mode shape 1 and mode shape 2 deformations. To get the second mode shape the two equations with two unknowns must be solved.

Alternatively, the second tip device 72b is provided at a location between the node of the mode 2 shape and the tip end of the blade, and the first tip device 72a is provided at a location between the node of said mode 2 shape and the root end of the blade. Further alternatively, the first and second tip devices 72a,72b are provided at a location between the node of the mode 2 shape and the tip end of the blade, the first tip device 72a spaced from said second tip device 72b along the longitudinal direction of the blade. The mode 1 and mode 2 shapes may be determined using simultaneous equations.

By monitoring the deflection of two separate points related to the mode 1 and mode 2 shapes of the blade, it is possible to derive the excitation level of the blade mode shapes. Accordingly, the blade moments, in particular the blade tilt and yaw moments, can be derived from the deflection of the devices. This system provides a considerable advantage over prior art systems, which are unable to determine blade moments from monitored blade deflection.

In one aspect, at least a portion of the wind turbine blade 10 may be coated with a radio-wave-absorbent material, which acts to reduce the radio reflectivity of the blade structure, thereby reducing the multipath effects on the communications link between the tip and root devices. In a preferred aspect, the radio-wave-absorbent material is provided on at least a portion of the blade adjacent the RF Line-of-Sight between the root devices and the tip devices. In an additional or alternative aspect, the surface of the wind turbine blade 10 proximate the RF Line-of-Sight between the root devices and the tip devices may be treated to reduce reflectivity, or to ensure that signals reflected from said surfaces are scattered over a relatively wider area compared to signals reflected from an untreated surface, such that the multipath effects on the communications link are further reduced. Such surface treatment may comprise the provision of relatively small abrasions or inconsistencies in the blade surface, to provide for a wider scattering of reflected signals.

Preferably, the communications link is using Ultra Wide Band (UWB) technology, but it will be understood that any other suitable radio-based communication and ranging technology may be used.

It will be understood that the brackets 74a,74b may be formed from any suitable structure, e.g. a projecting bar, a tripod construction. Preferably, the brackets 74a,74b comprise an open-frame construction, e.g. an open-frame tripod construction, such that the brackets 74a,74b present minimal wind resistance and/or operational noise during wind turbine operation.

Further features of the system of the invention may include the use of specialized antenna designs such as directional or circular polarized antennas for the root or tip devices, in order to further improve the communications link between the devices, and/or the implementation of pulse shape detection techniques for received signals.

It will be understood that the system may be retrofitted to an existing wind turbine blade. For example, at least one tip communication device may be attached to a wind turbine blade towards the blade tip end, and at least one root communication device may be attached towards the root end of the blade.

It will be understood that the blade deflection monitoring system of the invention may comprise any suitable control system for the efficient and effective operation of the system.

Figure 8:
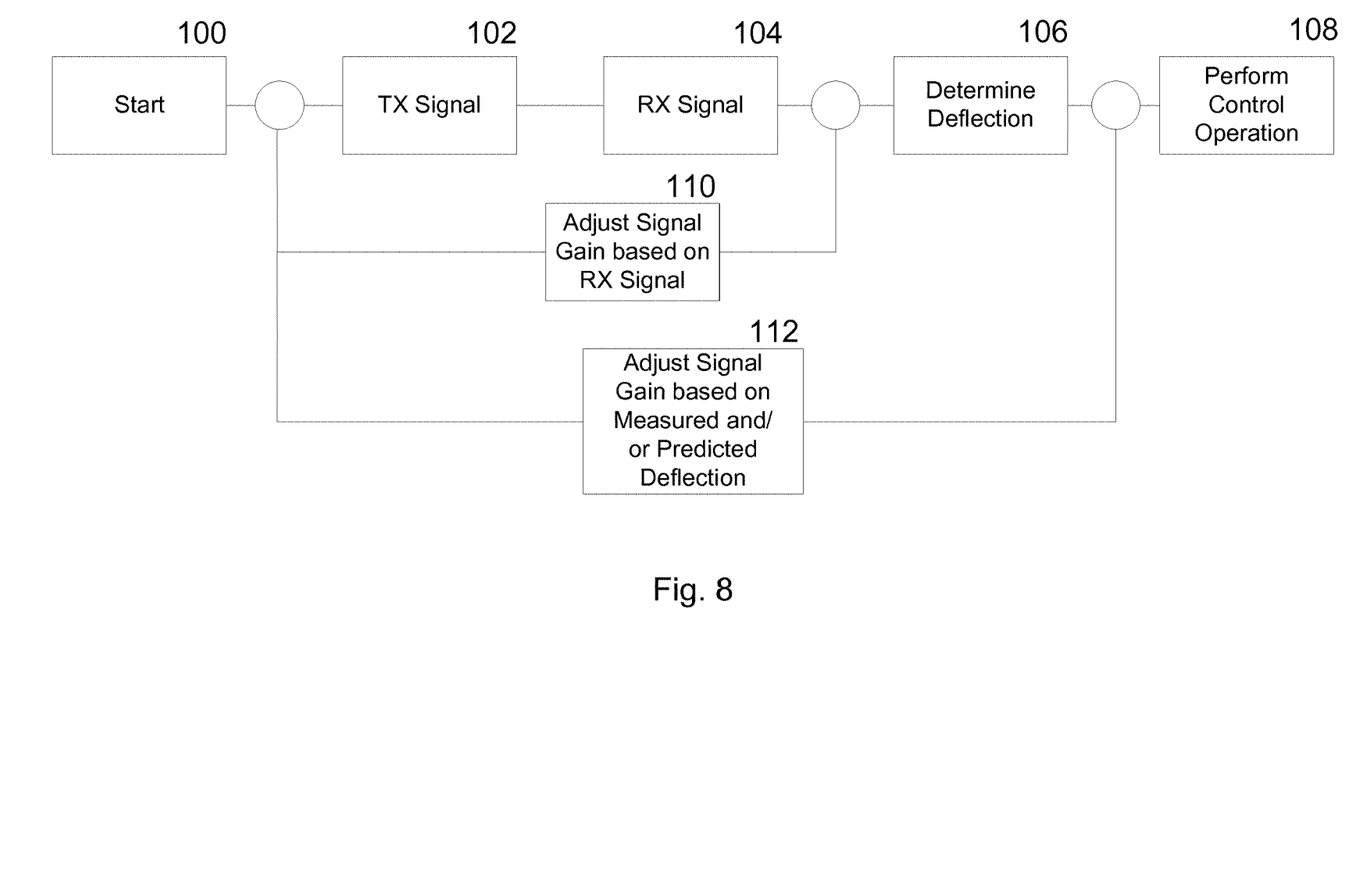
FIG. 8 is an overview of a control system for a blade deflection monitoring system according to an embodiment of the invention.

FIG. 8 shows a control scheme for a blade deflection monitoring system according to an aspect of the invention, which may be implemented with any of the above-described embodiments. It will be understood that the control system may be implemented in a dedicated controller incorporated in an individual blade, or may be implemented in a general purpose wind turbine controller.

On initialisation of the control scheme (step 100), the controller acts to establish a communication link between the at least one root communication device and the at least one tip communication device, as described in the above embodiments.

In step 102, the controller instructs the system to transmit a signal from a first of the communication devices to be received by a second of the communication devices (step 104). It will be understood that any suitable transmission system may be used, for example the at least one root device may be instructed to transmit a signal to be received by the at least one tip device, or vice versa, or the system may be operable to transmit a signal from a first device to a second device, which is then reflected back to the first device.

The transmitted signal may be in any suitable form, for example a 'ping'-type signal may be used, to measure the round-trip time for a message sent between the different communication devices of the communication link. Additionally or alternatively, the transmitted signal may comprise encoded data relating to a position measurement, e.g. GPS co-ordinates, and/or a timestamp indication, which can be used to determine the time-of-flight of the signal, and the associated distance involved in the communication link. The signal may be a simple ranging signal, allowing the different communication devices to lock on to the signal and determine time of flight, etc., and comprising no encoded data. Alternatively, the signal may be a data-modulated signal, which is operable to transmit data between the different communication devices, e.g. data output from a blade module such as calibration data from accelerometers provided towards the tip end of the blade, data outputs from remote sensors located at the tip end, etc, and/or a control signal for a blade active device, e.g. an active flap located towards the blade tip end.

Based on the signal received at step 104, the controller is operable to analyse the quality of the received signal, for example the signal strength and/or the signal-to-noise ratio, and to adjust the gain of the signal transmitted in step 102 based on this analysis. This allows for improved performance of the deflection monitoring system, as the signal gain can be increased for conditions wherein the initially received signal strength is low or has a high signal-to-noise ratio, thereby increasing the reliability of the deflection monitoring system by increasing the quality of the received signal. Furthermore, in cases where the signal quality of the received signal is above acceptable limits, the controller may be operable to reduce the signal gain of the transmitted signal in order to reduce the power requirements of the deflection monitoring system.

In some cases, the controller is operable to continually monitor the received signal based on the signal gain adjustment of the transmitted signal, and may determine that the received signal quality is affected by increased multipath or reflection effects on the signal. In such cases, the controller may be operable to reduce the signal gain of the transmitted signal, in order to reduce the magnitude of the reflected signals, thereby providing improved signal quality of the received signal.

In step 106, the received signal is used by the controller to determine blade deflection. As the received signal is used to determine a range measurement, the distance of the at least one tip communication device from the at least one root communication device can be measured, with changes in this distance an indication of blade deflection, at least at the location of said at least one tip device. In systems employing at least two root devices, the position of the at least one tip device can be determined using trilateration or triangulation techniques, to more precisely measure the deflection of the blade at the location of the tip device.

Based on the detected blade deflection, the controller is operable to instruct the wind turbine to perform a control operation (step 108) in order to prevent, or at least reduce the risk of, a tower strike from the wind turbine blades. This may involve performing a pitching operation for one or all of the wind turbine blades, braking the wind turbine to arrest blade rotation, and/or actuating a hinging mechanism for at least a portion of the blade, such that the blade-tower clearance is increased.

In cases where the deflection profile of the wind turbine blade in question is known, and/or the effects of different blade deflection shapes on the quality of signals transmitted and received along the communication link of the deflection monitoring system are known, it may be advantageous to adjust signal gain based on the deflection shape of the blade, thereby providing a faster response to potentially adverse communications conditions. Accordingly, based on the determined deflection of step 106, the controller may be operable to adjust the signal gain of the transmitted signal based on said determined deflection (step 112).

Additionally or alternatively, the controller may be operable to record the measured deflection of the wind turbine blade, and accordingly predict a likely future deflection profile for the blade, based at least in part upon the historical deflection pattern of the blade and/or the forecasted environmental conditions, e.g. wind speed, at the wind turbine. In such a case, in step 112 the adjustment of the signal gain for the transmitted signal may then be based at least in part upon the predicted deflection shape of the wind turbine blade.

Such an adaptive control scheme for the communication link between the root and tip devices can provide for improved performance of the deflection monitoring system, resulting in improved accuracy, speed, and power consumption of the system.

It will be understood that steps 110 and 112 are independent, and may be separately implemented in individual control systems according to the invention.

The invention provides a system and method to ensure accurate monitoring of blade deflection, having improved signal quality and reduced path loss between devices. As a result of this configuration, the deflection monitoring system has relatively low power requirements, and provides improved reliability compared to prior art wireless deflection monitoring systems. Furthermore, as all components of the monitoring system, i.e. the root devices and the tip devices, are provided on within the pitch frame of the wind turbine blade in question, this eliminates the need for relatively complicated signal compensation to be performed for measured signals, e.g. due to blade pitching when some components are mounted to a wind turbine hub, or due to turbine yawing when some components are mounted to a wind turbine tower.

The invention is not limited to the embodiments described herein, and may be modified or adapted without departing from the scope of the present invention.

The invention claimed is:

1. A wind turbine blade comprising an airfoil profile body having a pressure side and a suction side, and a leading edge and a trailing edge with a chord length extending therebetween, the blade having a tip end and a root end, the wind turbine blade further comprising:

at least one tip communication device located towards said tip end;

at least one root communication device located towards said root end, said at least one root communication device in wireless radio communication with said at least one tip communication device via a wireless communication path, to monitor the distance between said at least one tip communication device and said at least one root communication device to determine a movement of said at least one tip communication device relative to said at least one root communication device indicative of a blade deflection, wherein said at least one root communication device is provided on at least one bracket projecting from an external surface of said wind turbine blade at said root end, wherein said root communication device is spaced from the external surface of said blade to minimize path loss in the communication path between said at least one tip communication device and said at least one root communication device, and wherein the the at least one bracket comprises a first bracket and a second bracket, the at least one root communication device comprising a first root communication device provided on the first bracket and a second root communication device provided on the second bracket, the first and second root communication devices provided towards either the leading or trailing edge of the blade, wherein said first root communication device is located on the pressure side of the leading edge or the trailing edge of the blade and said second root communication device is located on the suction side of the leading edge or the trailing edge of the blade.

2. The wind turbine blade of claim 1, wherein said at least one bracket projects from the external surface of said wind turbine blade, said at least one root communication device located at a distal end of said at least one bracket, the wind turbine blade having a characteristic maximum deflection shape for the wind turbine blade, wherein the length by which said at least one bracket projects from the external surface of the wind turbine blade is selected based on said characteristic maximum deflection shape, such that the path loss of the communication path between said at least one tip communication device and said at least one root communication device is below a predetermined acceptable path loss level.

3. The wind turbine blade of claim 1, wherein said at least one bracket projects from the external surface of said wind turbine blade, said at least one root communication device located at a distal end of said at least one bracket, wherein said at least one tip communication device is provided on the external surface of the wind turbine blade, the wind turbine blade having a range of certified deflection shapes, wherein
the length by which said at least one bracket projects from the external surface of the wind turbine blade is selected such that a line-of-sight communication path is maintained between said at least one tip communication device and said at least one root communication device for said range of certified deflection shapes of said blade.

4. The wind turbine blade of claim 1, wherein said at least one tip communication device is provided internally of the blade body.

5. The wind turbine blade of claim 1, wherein said tip communication device is provided externally of the blade body.

6. The wind turbine blade of claim 1, wherein at least one of said at least one root communication and said at least one tip communication device is located towards the leading edge or the trailing edge of said wind turbine blade.

7. The wind turbine blade of claim 1, wherein the location of said communication devices are configured such that the communication signal between said communication devices propagates along either the leading or trailing edge of the wind turbine blade, and wherein flapwise bending of the wind turbine blade results in maximum change in signal propagation time.

8. The wind turbine blade of claim 1, wherein said at least one bracket projects at a height H above an external surface of said wind turbine blade, wherein the bracket height H is between 10%-50% of the diameter of the root end of the wind turbine blade.

9. The wind turbine blade of claim 1, wherein the wind turbine blade comprises a first root communication device provided on a first bracket and a second root communication device provided on a second bracket, wherein the first and second root communication devices are spaced from each other by a distance D, wherein distance D is between 75-200% of the diameter of the root end of the wind turbine blade.

10. The wind turbine blade of claim 1, wherein the wind turbine blade comprises a first tip communication device located at a first position along the length of the wind turbine blade towards the tip end of the blade and a second tip communication device located at a second position along the length of the wind turbine blade towards the tip end of the blade, wherein said first position is spaced from said second position, said second position located between said first position and said tip end.

11. The wind turbine blade of claim 10, the wind turbine blade having a mode 1 shape and a mode 2 shape, wherein said first tip communication device is located along the length of the blade at the node of said mode 2 shape, and wherein said second tip communication device is located towards said tip end, such that the excitation of the mode 1 and mode 2 shape of the wind turbine blade can be determined from the deflection of said first and second tip communication devices.

12. The wind turbine blade of claim 1, wherein said at least one root communication device is operable to determine the location of said at least one tip communication device using trilateration and/or triangulation.

13. The wind turbine blade of claim 1, wherein said at least one tip communication device and said at least one root communication device are ultra-wideband (UWB) location tracking and/or communication devices, and wherein said communication path is a UWB signal communication path.

14. The wind turbine blade of claim 1, wherein the wind turbine blade further comprises radio-wave absorbing material provided on at least a section of the wind turbine blade components.

15. The wind turbine blade of claim 1, wherein the wind turbine blade comprises at least one processor component communicatively coupled to at least one of said communication devices, wherein said at least one processor component is arranged in a controller housing located at or adjacent the root end of the wind turbine blade, wherein said at least one processor component is selected from at least one of the following: a receiver, a transmitter, a receiver-transmitter circuit, a transceiver, a controller.

16. A wind turbine having at least one wind turbine blade as claimed in claim 1.

17. A wind turbine as claimed in claim 16, further comprising a pitch control system operable to adjust the pitch of at least one wind turbine blade of said wind turbine, wherein the input to said pitch control system is at least partially based on the determined movement of said at least one tip communication device relative to said at least one root communication device indicative of a blade deflection.

18. A blade deflection monitoring system for installation on a wind turbine blade, the wind turbine blade comprising an airfoil profile body having a pressure side and a suction side, and a leading edge and a trailing edge with a chord length extending therebetween, the blade having a tip end and a root end, the monitoring system comprising:
at least one tip communication device for installation towards the tip end of a wind turbine blade,
at least one root communication device for installation towards the root end of a wind turbine blade, and
a controller to operate said communication devices in wireless communication to monitor the distance between said at least one tip communication device and said at least one root communication device when installed on a wind turbine blade to determine a movement of said at least one tip communication device relative to said at least one root communication device indicative of a blade deflection, wherein
said at least one root communication device is arranged to be located spaced from an external surface of the wind turbine blade at said root end, and
wherein the at least one root communication device comprises a first root communication device provided on a first bracket and a second root communication device provided on a second bracket, the first and second root communication devices provided towards either the leading or trailing edge of the blade, wherein said first root communication device is located on the pressure side of the leading edge or the trailing edge of the blade and said second root communication device is located on the suction side of the leading edge or the trailing edge of the blade.

19. The blade deflection monitoring system of claim 18, wherein the monitoring system comprises at least one bracket for mounting on an external surface of a wind turbine blade at the root end of the wind turbine blade, wherein said at least one root communication device is arranged on a distal end of said at least one bracket.

20. A method of monitoring the deflection of a wind turbine blade, the wind turbine blade having a pressure side and a suction side, and a leading edge and a trailing edge with a chord length extending therebetween, the blade having a tip end and a root end, the method comprising the steps of:

providing at least one tip communication device located towards the tip end of a wind turbine blade, providing at least one root communication device located towards the root end of said wind turbine blade, said at least one root communication device in wireless communication with said at least one tip communication device via a wireless communication path, transmitting a signal between said at least one tip communication device and said at least one root communication device along said wireless communication path, calculating a distance measurement between said at least one tip communication device and said at least one root communication device based on said signal, and determining a current blade deflection value based on said distance measurement, wherein the method further comprises the step of adjusting a signal gain level of said signal based on at least one of the following: the current blade deflection value, a predicted blade deflection value based at least in part upon said current blade deflection value, or a signal strength level of a signal received via said communication path, wherein the at least one root communication device comprises a first root communication device provided on a first bracket and a second root communication device provided on a second bracket, the first and second root communication devices provided towards either the leading or trailing edge of the blade, wherein said first root communication device is located on the pressure side of the leading edge or the trailing edge of the blade and said second root communication device is located on the suction side of the leading edge or the trailing edge of the blade.

21. A method of controlling a wind turbine having at least one wind turbine blade, the method comprising the steps of:

monitoring the deflection of at least one wind turbine blade as claimed in claim 20; and controlling the operation of the wind turbine blade based at least in part on the monitored deflection of the at least one wind turbine blade, preferably by pitching at least one wind turbine blade to control the deflection of said at least one wind turbine blade.

22. A method of designing a blade monitoring system for use on a wind turbine blade as claimed in claim 1, the method comprising the steps of:

providing a wind turbine blade comprising an airfoil profile body having a pressure side and a suction side, and a leading edge and a trailing edge with a chord length extending therebetween, the blade having a tip end and a root end and a defined characteristic deflection profile;

providing at least one tip communication device located towards said tip end;

providing at least one root communication device located towards said root end, said at least one root communication device in wireless communication with said at least one tip communication device via a wireless communication path, to monitor the distance between said at least one tip communication device and said at least one root communication device to determine a movement of said at least one tip communication device relative to said at least one root communication device indicative of a blade deflection;

providing at least one bracket projecting from an external surface of said wind turbine blade at said root end, wherein said at least one root communication device is provided on said at least one bracket; and calculating a predicted signal quality level for the wireless communication path between said at least one tip communication device and said at least one root communication device for a series of blade deflection shapes of said defined characteristic deflection profile, wherein the method further comprises the step of:

selecting the height of said at least one bracket such that said at least one root communication device is spaced from the external surface of said blade, such that the predicted signal quality level for the wireless communication path is above an acceptable quality limit for a defined range of blade deflection shapes of said defined characteristic deflection profile.

23. The method as claimed in claim 22, wherein said defined range of blade deflection shapes comprises the certified deflection range of said wind turbine blade.

24. The method as claimed in claim 22, wherein the height of said bracket is selected such that a direct line between said at least one tip communication device and said at least one root communication device passes through less than a predefined blade laminate thickness for said defined range of blade deflection shapes.

25. The method as claimed in claim 24, wherein said direct line passes through less than two layers of laminate of the wind turbine blade for said defined range of blade deflection shapes.

26. The method as claimed in claim 22, wherein the height of said bracket is selected such that a clear line of sight is maintained between said at least one tip communication device and said at least one root communication device for said defined range of blade deflection shapes.

27. A wind turbine blade designed according to the method of claim 22.

* * * * *